May 11, 1926.

P. EISENBACH 1,584,082

SPRING WHEEL

Filed Sept. 15, 1924    2 Sheets-Sheet 1

Inventor
Peter Eisenbach

By Stuart C Barnes
Attorney

May 11, 1926.  
P. EISENBACH  
SPRING WHEEL  
Filed Sept. 15, 1924
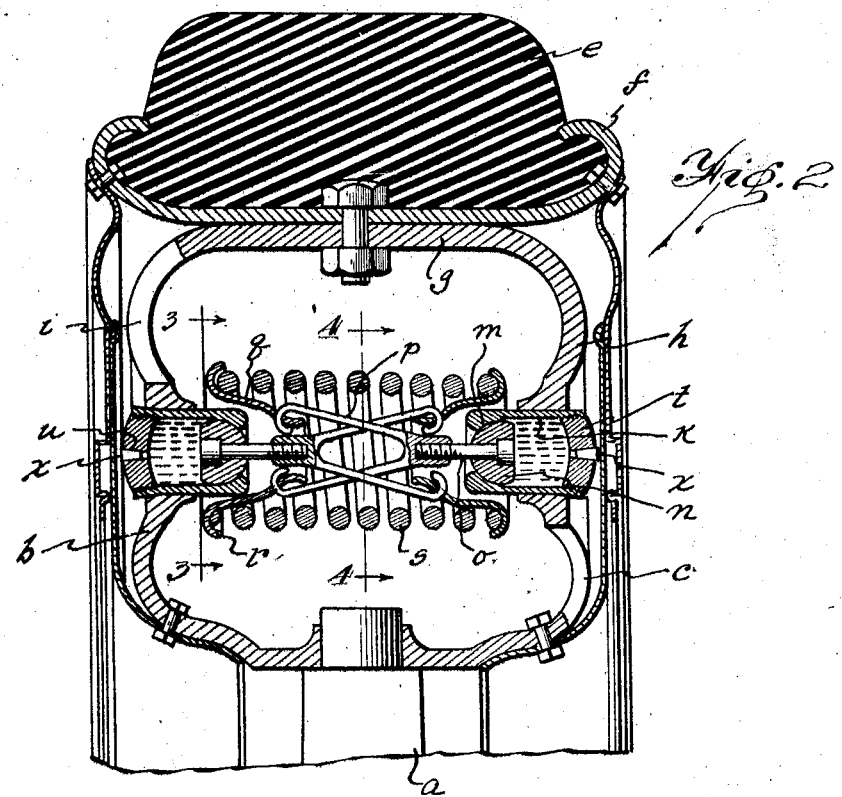
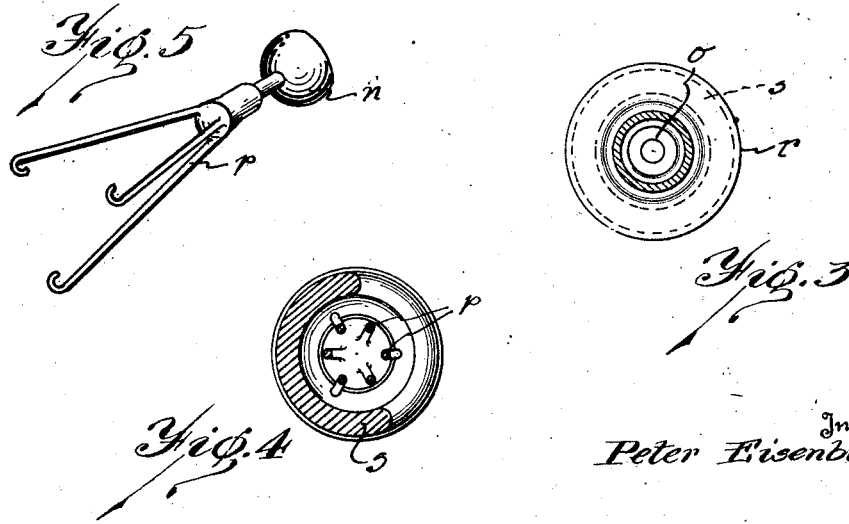
Inventor  
Peter Eisenbach  
By Stuart C. Barnes  
Attorney Patented May 11, 1926.

1,584,082

UNITED STATES PATENT OFFICE.

PETER EISENBACH, OF DETROIT, MICHIGAN.

SPRING WHEEL.

Application filed September 15, 1924. Serial No. 737,747.

This invention relates to spring wheels and has for its object the provision of a more efficient and better working compression spring connection between the two wheel sections. It is the purpose of this invention to provide means whereby relative movement between the two wheel sections is opposed by the compression springs connecting the two, an action which will be more clearly understood after the detailed description of the working parts is explained hereinafter. Springs of this general character are not broadly new, and this invention relates to the improved combination of the several parts which enables one to quickly assemble the wheel and gives the wheel the resiliency desired with a lesser number of parts.

In the drawings:

Fig. 2 is a section on the line 2—2 of Fig. 1.

Fig. 3 is a section on the line 3—3 of Fig. 2.

Fig. 4 is a section on the line 4—4 of Fig. 2.

Fig. 5 is a detail perspective of the stud and the tripodal fixture secured thereto.

Figure 1:
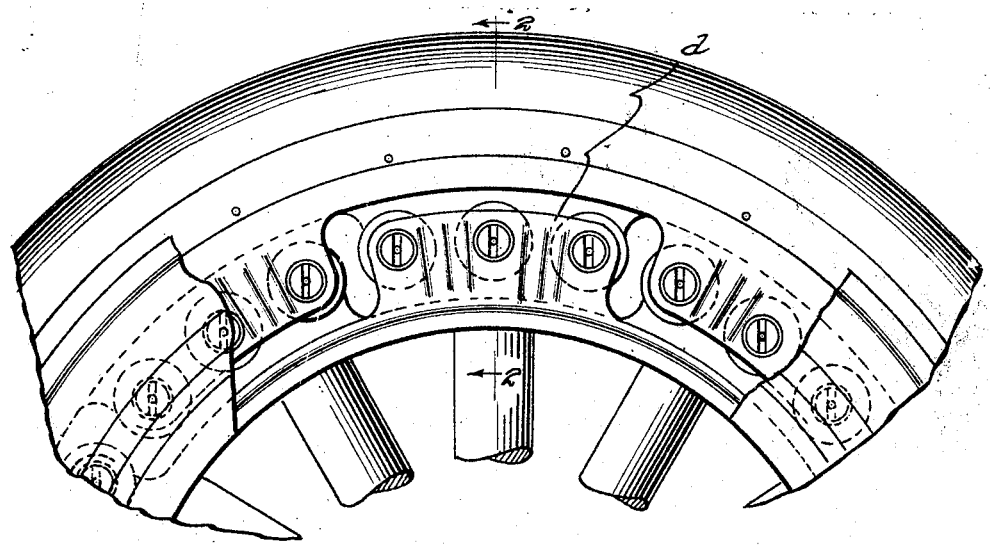
Fig. 1 is an elevational view of a portion of a wheel equipped with my device.

The inner wheel section is built in a manner similar to the usual construction, which includes the spokes $a$; secured about these spokes is an inner ring provided with the side flanges $b$ and $c$. In Fig. 1 the construction of these side flanges is clearly shown, the side flanges being cut away at spaced intervals leaving the ears $d$. These ears are corrugated and arranged in staggered relation to each other for a purpose later to be described. The outer wheel section comprises a tire $e$, a clincher rim $f$, about which the tire is secured, and secured to this tire rim is an outer ring $g$ which is provided with the side flanges $h$ and $i$. These side flanges are constructed similar to the side flanges of the inner ring and are cut away so as to provide ears which are arranged in staggered relation to each other, the ears carried by the outer section, when the two parts of the wheel are assembled together, being directly opposite the ears carried by the inner wheel section.

A stud retaining fixture $k$ is fitted in a suitable hole carried by the side flanges, each fixture being provided with a recess, the bottom of the recess being curved to form a swiveling bearing $m$ for receiving the mushroom head $n$ of the stud $o$. Screwed or otherwise secured to the inner end of the stud is a tripodal hook connection $p$. As shown in Fig. 2, one fixture is supported by the outer ring while at the opposite side of the wheel another fixture is supported by the inner ring. Hooked into the extreme ends of these tripodal hooks are spring retaining members $q$ which are provided with the outwardly turned flanges $r$, which are adapted to seat the ends of the strong compression spring $s$. It can be obviously seen from Fig. 2 that this compression spring $s$ tends to expand, thereby directly pulling on the stud through the above described connections. This will translate the outward pressure of spring $s$ into a direct pull on the studs, thereby tending to draw them together and firmly seating the mushroom head $n$ in the swiveling bearing socket $m$. Plugs $t$ may be screwed or otherwise secured in the recessed fixture for closing the mouth of the fixture. Oil holes $u$ are provided in the plug through which oil may be introduced into the recess for lubricating the bearing surfaces of the mushroom heads and the socket swivel joint. The holes may be closed by the wooden plugs $x$.

Any relative movement between the two wheel sections will be absorbed in the compression spring $s$. It may be obviously seen that if the flange on the right as seen in Fig. 2, which is carried by the outer wheel section, should move relatively to the inner section, it will draw the spring retaining member to the right, thereby tending to compress the spring $s$. This method of utilizing the inherent strength of the spring for absorbing road shocks is not broadly new. This invention relates merely to the detail of construction. Each fixture which supports the stud having the mushroom head may be assembled together as a unit and then assembled to the inner and outer rings, very simply and quickly. The tripodal hooks carried by the inner end of the studs enable one to so position the legs that they will fit in between each other as shown in Fig. 4, thus enabling one to mount the entire mechanism within the coil spring $s$, thereby utilizing a minimum of space.

What I claim is:

1. In a spring wheel, the combination of an inner wheel section provided with side flanges, an outer wheel section provided with side flanges, compression spring units connecting the side flange of one section to the side flange of the other section, said units each comprising a pair of studs having mushroom heads bearing fixtures secured to the said side flanges of both wheel sections and positioned opposite each other, said fixtures provided with a recess and a bearing surface at the bottom of the recess for providing a universal support for the mushroom heads of the studs, and a plug for closing the opening of said recess and having a passageway therethrough to allow the insertion of a lubricant through said passageway into the interior of the fixture to lubricate the bearing parts.

2. In a spring wheel, the combination of an inner wheel section provided with side flanges, an outer wheel section provided with side flanges, compression spring units connecting the side flange of one wheel section to the side flange of the other wheel section and each including a compression spring, retaining rings at both ends of the compression spring, a pair of studs having relative movement with respect to each other and provided with mushroom heads, means carried by the side flanges for providing a universal support for the said mushroom heads, means positively secured to said stud for connecting the stud to the spring retaining ring on the opposite side of the wheel, whereby the compressive stresses of the spring are translated into a direct inward tensile strain or pull on the studs to yieldingly force the studs toward each other.

3. In a spring wheel, the combination of an inner wheel section provided with side flanges, an outer wheel section provided with side flanges, compression spring units connecting the side flanges of one wheel section to the side flange of the other wheel section and each comprising a compression spring, retaining rings at both ends of the spring, a pair of studs having relative movement with respect to each other, means carried by the said side flanges for providing a universal support for the said studs, and a tripodal gripping member rigidly secured to the inner end of the stud and arranged to engage the spring retaining member on the other side of the wheel, whereby the compressive stresses of said compression spring are translated into a direct tensile stress or pull on the stud.

4. In a spring wheel, the combination of an inner wheel section provided with side flanges, an outer wheel section provided with side flanges, compression spring units connecting the side flange of one wheel section to the side flange of the other wheel section, and each including a compression spring and spring retaining rings positioned at both ends of the spring provided with outwardly turned flanges provided with a circular trough for supporting the ends of the spring, studs provided with a plurality of fingers rigidly secured thereto and adapted to be detachably secured to the spring retaining ring, and means carried by the said side flange for providing a universal support for the said studs.

In testimony whereof I have affixed my signature.

PETER EISENBACH.